United States Patent [19]

Roberts et al.

[11] 3,852,612

[45] Dec. 3, 1974

[54] SELECTIVE LOW LEVEL IRRADIATION TO IMPROVE BLOCKING VOLTAGE YIELD OF JUNCTIONED SEMICONDUCTORS

[75] Inventors: John S. Roberts, Export; Michael W. Cresswell, Pittsburgh, both of Pa.

[73] Assignee: Westinghouse Electric Corporation, Pittsburgh, Pa.

[22] Filed: Feb. 1, 1974

[21] Appl. No.: 438,931

Related U.S. Application Data

[63] Continuation of Ser. No. 285,165, Aug. 31, 1972, abandoned.

[30] Foreign Application Priority Data

Aug. 10, 1973 Belgium .............................. 532273

[52] U.S. Cl. .............................. 250/492 A, 29/584

[51] Int. Cl. ........................................ H01j 37/00

[58] Field of Search ........... 250/492 A; 219/121 EB; 29/584; 148/1.5

[56] References Cited

UNITED STATES PATENTS 3,691,376 9/1972 Bauerlein ........................ 250/492 A

*Primary Examiner*—James W. Lawrence
*Assistant Examiner*—C. E. Church
*Attorney, Agent, or Firm*—C. L. Menzemer

[57] ABSTRACT

The blocking voltage capability of PN junctioned semiconductor devices selected from transistors and thyristors is increased, while maintaining the forward voltage drop capability, by selectively irradiating with low level irradiation corresponding to an exposure of less than $1 \times 10^{13}$ electrons/cm$^2$ with 2 Mev electron radiation. The devices are preferably irradiated with electron radiation of an intensity greater than 1 Mev and most desirably 2 Mev to an electron exposure below $1 \times 10^{13}$ electrons/cm$^2$.

4 Claims, 3 Drawing Figures

SELECTIVE LOW LEVEL IRRADIATION TO IMPROVE BLOCKING VOLTAGE YIELD OF JUNCTIONED SEMICONDUCTORS

RELATED APPLICATIONS

The present application is a continuation of application Ser. No. 285,165, filed Aug. 31, 1972 now abandoned.

FIELD OF THE INVENTION

The present invention relates to the manufacture of semiconductor devices and particularly high power semiconductor devices utilizing PN junctions.

BACKGROUND OF THE INVENTION

In making PN junctioned semiconductor devices and particularly transistors and thyristors, many units fail to meet the blocking voltage rating for which they are designed. This failure is particularly pronounced in high power devices with design blocking voltages of 1,400 volts and higher. It is not unusual with such power devices to have quantitative yields below 50 percent. The devices which are rejected are only of marginal commercial value. Some may have electrical characteristics that make them useable in some alternative applications, but such secondary uses usually result in a compromise of the electrical characteristics appropriate for the secondary application.

The rated blocking voltage of such a PN junctioned semiconductor device is usually classified by the lowest of the forward and reverse blocking voltages at firing or driving of the device without exceeding a specified leakage current, (e.g., 13 ma) at a specified temperature, (e.g., 125°C). The problem of raising quantitative yields thus centers on reducing the leakage current for the blocking PN junctions of the device as a function of the applied voltage.

It has been proposed to irradiate semiconductor devices and particularly thyristors to change the electrical characteristics of them. For example, it has been described in Pat. application Ser. No. 324,718, filed Jan. 18, 1973, (assigned to the same assignee as the present application) to "bulk" or indiscriminately irradiate at high levels fast switching thyristors to decrease the turn-off time. However, in such instances of high level irradiation, the gate sensitivity and the forward voltage drop of the device were compromised for the desired parameter. Indeed, irradiation has been known to raise the forward voltage drop beyond tolerable levels while raising blocking voltage. Irradiation has, therefore, been rejected as a viable solution to the problem of reclaiming devices which were rejected because of failure to meet accompanying forward voltage drop requirements.

Moreover, it has been described in copending Pat. application Ser. No. 283,684, filed Aug. 25, 1972, to selectively irradiate the peripheral portion of junctioned semiconductor devices such as thyristors to increase the blocking voltage without significantly affecting the forward voltage drop. This procedure, however, requires masking of the bulk portion of the semiconductor device with precision which is time-consuming, expensive and leaves a margin for error.

The present invention goes against prior understanding and utilizes irradiation to overcome the observed difficulties and disadvantages in the making of junctioned semiconductor devices with high blocking voltage ratings. It provides a relatively inexpensive way of increasing the blocking voltage without jeopardizing the forward voltage drop capability of the semiconductor devices, and does so in a different way from our prior invention described in copending application Ser. No. 283,684. It also provides a relatively inexpensive way of reclaiming prepared devices which would otherwise be rejected for failure to meet a specified voltage rating.

SUMMARY OF THE INVENTION

The present invention provides certain junctioned semiconductor devices and particularly silicon transistors and thyristors with increased blocking voltage capability without significantly increasing the forward voltage drop of the device. The device is provided in a semiconductor body and, for thyristors, preferably has an N-impurity base region of less than 300 microns in thickness. The body is disposed with one major surface exposed to a radiation source and thereafter the body is indiscriminately irradiated through the major surface by the radiation source to a low level of exposure.

By "low level" of exposure, it is meant that the radiation dosage does not exceed that corresponding to greater than $1 \times 10^{13}$ electrons/cm$^2$ with 2 Mev electron radiation. To provide appropriate radiation, it has been found that radiation dosages below $1 \times 10^{13}$ electrons/cm$^2$ of 2 Mev electron radiation must be used. Preferably, the radiation dosage is maintained between about $1 \times 10^{12}$ electrons/cm$^2$ and $1 \times 10^{13}$ electrons/cm$^2$. Higher dosage levels have been found to raise forward voltage drop beyond tolerable limits.

Electron radiation is preferably used as the radiation source because of availability and inexpensiveness. Moreover, electron radiation (or gamma radiation) may be preferred in some applications where the damage desired in the semiconductor lattice is to single atoms and small groups of atoms. This is in contrast to neutron and proton radiation which causes large disordered areas of as many as a few hundred atoms in the semiconductor crystal. The latter type of radiation may be preferred in certain applications because of its better defined range and more controllable depth of lattice damage. It is anticipated that any kind of radiation may be appropriate provided it is capable of bombarding and disrupting the atomic lattice to create energy levels substantially decreasing carrier lifetime without correspondingly increasing the carrier generation rate.

Electron radiation is also preferred over gamma radiation because of its availability to provide adequate dosages in a commercially practical time. For example, a $1 \times 10^{12}$ electrons/cm$^2$ dosage of 2 Mev electron radiation will result in approximately the same lattice damage as that produced by a $1 \times 10^6$ rads dosage of gamma radiation. Such a dosage of gamma radiation, however, would entail days of irradiation, while such dosage can be supplied by electron radiation in minutes. Further, it is preferred that the radiation intensity level of electron radiation be greater than 1 Mev. Lower intensity level radiation is generally believed to result in substantial elastic collisions with the atomic lattice and, therefore, does not provide enough damage to the lattice in a commercially practical time period.

Other details, objects and advantages of the invention become apparent as the following description of the present preferred embodiments and the present preferred methods of practicing the same proceed.

BRIEF DESCRIPTION OF THE DRAWINGS

In the accompanying drawings, the preferred embodiments of the invention and preferred methods of practicing the invention are illustrated in which.

DESCRIPTION OF THE PREFERRED EMODIMENTS

Figure 1:
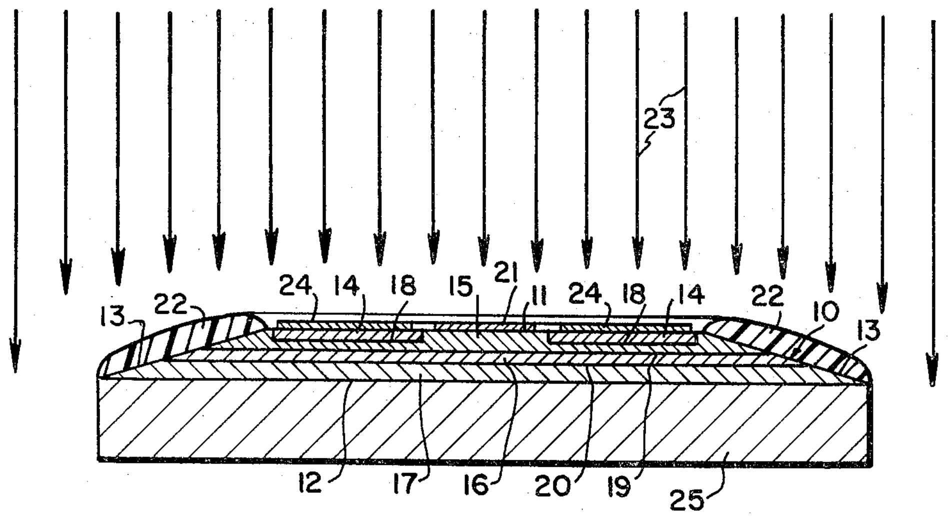
FIG. 1 is an elevational view in cross-section of a center-fired thyristor being irradiated in accordance with the present invention.

Referring to FIG. 1, center-fired silicon thyristor wafer body 10 of 1,600 volt design blocking capacity is shown having opposed major surfaces 11 and 12 and curvilinear side surfaces 13. The thyristor wafer 10 has cathode-emitter region 14 and anode-emitter region 17 of impurities of opposite conductivity type adjoining major surfaces 11 and 12, respectively, and cathode-base region 15 and anode-base region 16 of impurities of opposite conductivity type in the interior of the wafer between emitter regions 14 and 17. Cathode-emitter region 14 and cathode-base region 15 are also of impurities of opposite conductivity type, as are anode-base region 16 and anode-emitter region 17. By this arrangement, thyristor wafer 10 is provided with a four-layer impurity structure in which three PN junctions 18, 19 and 20 are provided.

The thyristor is provided with a center-fired gate by adjoining cathode-base region 15 to the major surface 11 at center portions thereof. Cathode-emitter region 14 thus extends around surface portions of region 15. To provide electrical connections to the thyristor wafer, metal contacts 21 and 24 make ohmic contact to cathode-base region 15 and cathode-emitter region 14, respectively, at major surface 15; and metal substrate 25 makes ohmic contact to anode-emitter region 17 at major surface 12. Atmospheric effects on the thyristor operation are substantially reduced by coating side surfaces 13 with a suitable passivating resin 22 such as a silicone or epoxy composition.

The assembled thyristor semiconductor body 10 is positioned with major surface 11 adjoining cathode-emitter region 14 exposed to a radiation source and preferably a 2 Mev electron radiation source. The body 10 is then irradiated substantially uniformly through the major surface by radiation 23 to a low level of exposure, i.e., less than about $1 \times 10^{13}$ electrons/cm$^2$. Preferably, the level of exposure is greater than about $1 \times 10^{12}$ electrons/cm$^2$. Apparatus for performance of the irradiation in accordance with the present invention on a series of thyristors is shown and described in copending application Ser. No. 324,718, filed Jan. 18, 1973, and assigned to the same assignee as the present invention.

To illustrate the merits of the invention, three groups of thyristors of 1600 volt design blocking capacity were irradiated at a low level of exposure with 2 Mev electron radiation. The thyristor wafers were 1.28 inches in diameter with a cathode-emitter region, because of the beveled side surfaces, of 1.08 inches in diameter. The thyristors had an N-impurity base thickness of about 300 microns. The forward blocking voltage, reverse blocking voltage and forward conducting voltage drop were measured before and after irradiation, and controls were maintained for comparison.

The first group of thyristors were irradiated at an exposure of $2.0 \times 10^{12}$ electrons/cm$^2$ with 2 Mev electron radiation. The measurements of electrical characteristics before and after irradiation are shown in Table I.

TABLE I

| Run No. | $V_{B\phi}$ (1) | | $V_R$ (2) | | $V_F$ (3) | |
|---|---|---|---|---|---|---|
| | Before | After | Before | After | Before | After |
| 1 | 1800 | 1900 | 1400 | 1300 | 1.16 | 1.25 |
| 2 | 0 | 0 | 0 | 0 | — | — |
| 3 | 1200 | 1500 | 1500 | 1300 | 1.13 | 1.24 |
| 4 | 1700 | 700 | 1200 | 1200 | 1.16 | 1.28 |
| 5 | 700 | 1700 | 1200 | 1300 | 1.16 | 1.28 |
| 6 | 1900 | 1900 | 1200 | 1300 | 1.17 | 1.26 |
| 7 | 1400 | 1700 | 1200 | 1200 | 1.17 | 1.24 |
| 8 | 1600 | 1800 | 1000 | 1200 | 1.17 | 1.26 |
| 9 | 1400 | 1700 | 1200 | 1200 | 1.16 | 1.24 |
| 10 | 1200 | 1400 | 1200 | 1300 | 1.15 | 1.24 |
| 11 | 0 | 0 | 0 | 0 | — | — |
| 12 | 1700 | 1700 | 1300 | 1300 | 1.16 | 1.29 |
| 13 | 1600 | 1700 | 1200 | 1100 | 1.15 | 1.24 |
| 14(4) | 1300 | 1200 | 1300 | 1100 | 1.18 | 1.21 |
| 15 | 1600 | 1700 | 1400 | 1300 | 1.16 | 1.27 |
| 16 | 1600 | 1800 | 1400 | 1300 | 1.17 | 1.27 |
| 17 | 1800 | 1900 | 1300 | 1300 | 1.13 | 1.23 |
| 18 | 1400 | 1700 | 1100 | 1200 | 1.16 | 1.28 |
| 19 | 1800 | 1700 | 1300 | 1200 | 1.16 | 1.27 |
| 20 | 1500 | 1900 | 1200 | 1300 | 1.16 | 1.25 |
| 21 | 1000 | 1200 | 1300 | 1300 | 1.14 | 1.24 |
| 22 | 1600 | 1700 | 1000 | 1100 | 1.15 | 1.23 |
| 23(4) | 1500 | 1300 | 1500 | 1100 | 1.14 | 1.15 |
| 24 | 2000 | 1900 | 1400 | 1300 | 1.17 | 1.27 |
| 25 | 1700 | 1700 | 1200 | 1200 | 1.16 | 1.25 |

(1) Forward blocking voltage ($V_{B\phi}$) is measured in volts at approximately 125°C with 13 ma maximum leakage current.

(2) Reverse blocking voltage ($V_R$) is measured in volts at approximately 125°C with 13 ma maximum leakage current.

(3) Forward voltage drop in the conducting mode ($V_F$) is measured in volts at approximately 125°C and 625 amps of current.

(4) Run Nos. 14 and 23 were control runs and were not irradiated at all; they merely had their electrical characteristics measured at the same time and with the same equipment used to measure the characteristics of the other thyristors which were irradiated.

As shown by Table I, the blocking voltage capability of the thyristors was significantly increased by the low level irradiation while the forward voltage drop changed only a small tolerable amount. The significance of the apparent increases of forward blocking voltage ($V_F$) displayed in Table I should be considered in conjunction with the data acquired on the two control thyristors, Run Nos. 14 and 23. The control thyristors were not irradiated but seemingly lost blocking voltage during the period between measurements. This type of apparent "loss" has previously been identified with a higher fixture temperature which, in this case, would have prevailed when the post-radiation measurements were made. The lack of an apparent increase in the reverse blocking voltage ($V_R$) measurement should likewise be reconciled with the apparent decrease of reverse blocking voltage to the two control thyristors. Corrections applied to the data on the basis of the control thyristor measurements would favorably increase the magnitude of the effectiveness of the invention.

The second group of thyristors were irradiated at an exposure of $1.72 \times 10^{12}$ electrons/cm$^2$. The measured electrical characteristics before and after irradiation are shown in Table II.

TABLE II

| Run No. | $V_{B\phi}$ (1) | | | $V_R$ (2) | | |
|---|---|---|---|---|---|---|
| | Before | After | | Before | After | |
| 1 | 1200 | 150 | (3) | 1500 | 150 | (3) |
| 2 | 1200 | 1300 | | 1600 | 1500 | |
| 3 | 800 | 1100 | | 1875 | 1800 | |
| 4 | 450 | 600 | | 1400 | 1650 | |
| 5 | 1050 | 1600 | | 1100 | 1300 | |
| 6 | 1150 | 1500 | | 1700 | 1650 | |
| 7 | 1000 | 1200 | | 1250 | 1250 | |
| 8 | 1600 | 1650 | | 1450 | 1500 | |
| 9 | 1450 | 1800 | | 2150 | 2050 | |
| 10 | 850 | 1150 | | 1600 | 1700 | |
| 11 | 1050 | 1400 | | 1700 | 1700 | |
| 12 | 1500 | 1500 | | 1300 | 1325 | |
| 13 | 900 | 1100 | | 1450 | 1000 | (3) |
| 14 | 1400 | 1750 | | 1900 | 2000 | |
| 15 | 1400 | 1850 | | 1300 | 1450 | |

(1) Forward blocking voltage ($V_{B\phi}$) is measured in volts at approximately 125°C with 13 ma maximum leakage current.
(2) Reverse blocking voltage ($V_R$) is measured in volts at approximately 125°C with 13 ma maximum leakage current.
(3) This type of catastrophic failure is occasionally observed under test conditions. It is believed that it is entirely unrelated to the irradiation treatment.

As shown by Table II, the low level irradiation increased the forward blocking voltage capability of the thyristors. Although the $V_F$ increases were not measured, it can be projected that such measures are less than those indicated in Table I, since the irradiation level was lower. The reverse voltage behavior is not considered conclusive because of the comparatively lighter radiation as compared to the case in Table I.

Figure 2:
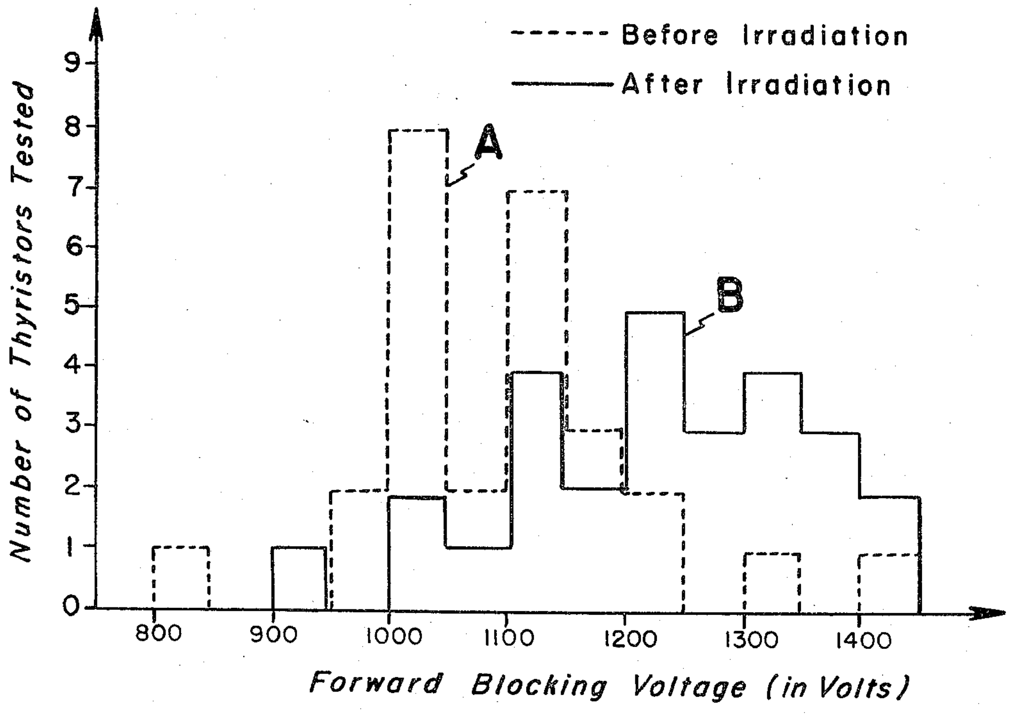
FIG. 2 is a graph showing the change with irradiation in accordance with the present invention of forward blocking voltage capability of thyristors similar to that illustrated by FIG. 1.
Figure 3:
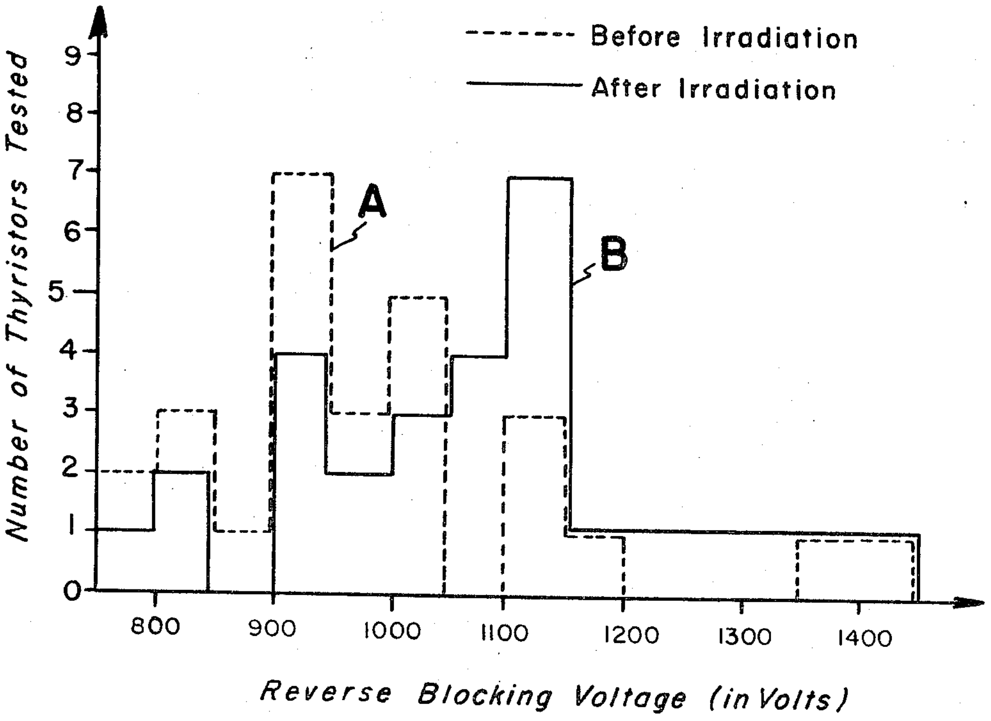
FIG. 3 is a graph showing the change with irradiation in accordance with the present invention of reverse blocking voltage capability of thyristors similar to that illustrated by FIG. 1.

The third group of thyristors were irradiated at an exposure of only $1 \times 10^{12}$ electrons/cm$^2$ with 2-Mev electron radiation. The results are shown in FIGS. 1 and 2. Curves A show the blocking voltages before irradiation, and Curves B show the blocking voltages after irradiation. A clear shift is shown in the distribution of the blocking voltage capacities. While the increases in blocking voltages are not generally large, they are commercially significant. Additional exposures of the thyristors of the first group (Table I) demonstrated that the effect generally continues to be cumulative as radiation exposure is increased to $1 \times 10^{13}$ electrons/cm$^2$. Thus, it is concluded that the relative smallness of the effect portrayed in the third group, although commercially important, could be still further increased if, for example, an additional exposure of $1 \times 10^{12}$ electrons/cm$^2$ had been applied.

While presently preferred embodiments have been shown and described with particularity, it is distinctly understood that the invention may be otherwise variously performed within the scope of the following claims. Because of the mechanism believed to be involved, it follows that the invention has special utility with gated semiconductor devices such as transistors and thyristors. The mechanism is believed to be the lowering of carrier lifetime without correspondingly increasing the carrier generation rate through the introduction of radiation-induced lattice defects which serve as electron-hole recombination centers. The bulk leakage current through the device is thereby suppressed. If this mechanism is correct, the invention does not have effect to improve the blocking voltage of devices such as rectifiers where gain is not involved.

What is claimed is:

1. A method of increasing the blocking voltage of certain semiconductor devices without significantly increasing the forward voltage drop comprising the steps of:

a. positioning a semiconductor body containing the semiconductor device with a major surface of the body to be exposed to a radiation source;

b. thereafter increasing the blocking voltage of the semiconductor device without significantly increasing the forward voltage drop by selectively irradiating the semiconductor body to a low level of exposure corresponding to an exposure of less than $1 \times 10^{13}$ electrons/cm$^2$ with 2-Mev electron radiation.

2. A method of increasing the blocking voltage of certain junctioned semiconductor devices without significantly increasing the forward voltage drop as set forth in claim 1 wherein:

the radiation source is electron radiation.

3. A method of increasing the blocking voltage of certain junctioned semiconductor devices without significantly increasing the forward voltage drop as set forth in claim 2 wherein:

the electron radiation has an intensity greater than 1-Mev.

4. A method of increasing the blocking voltage of certain junctioned semiconductor devices without significantly increasing the forward voltage drop as set forth in claim 3 wherein:

the irradiation is to a level of exposure greater than $1 \times 10^{12}$ electrons/cm$^2$.

* * * * *